No. 122,028

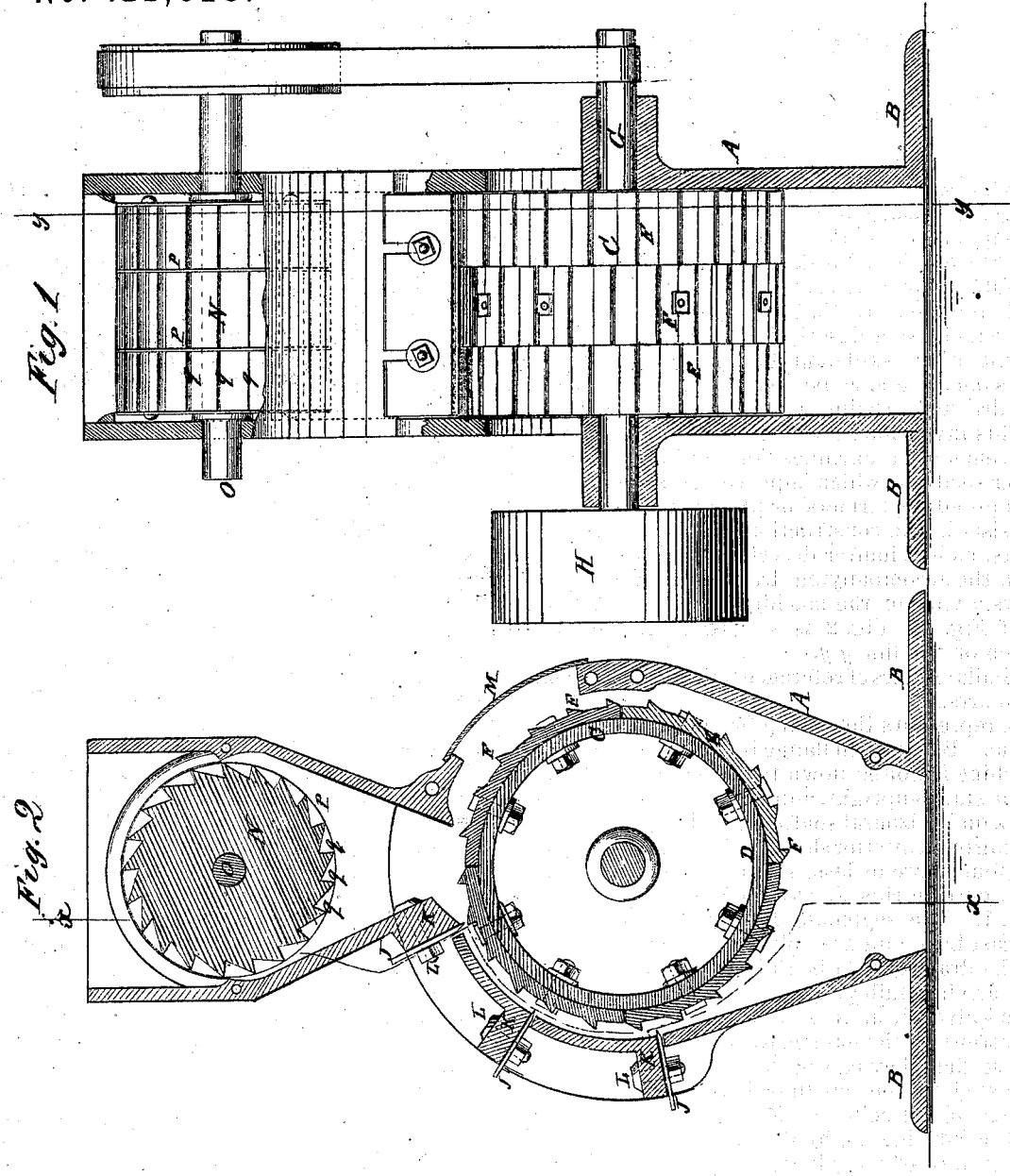

UNITED STATES PATENT OFFICE.

DAVID KAHNWEILER, OF NEW YORK, N. Y.

IMPROVEMENT IN FEED DEVICES FOR HULLING-MACHINES.

Specification forming part of Letters Patent No. 122,028, dated December 19, 1871.

*To all whom it may concern:*

Be it known that I, DAVID KAHNWEILER, of the city of New York, in the county of New York, and State of New York, have invented a new and useful Improvement in Hulling-Machines; and I do hereby declare that the following is a full, clear, and exact description thereof, which will enable others skilled in the art to make and use the same, reference being had to the accompanying drawing forming part of this specification.

This invention relates to new and useful improvements in machines for hulling cotton and other seeds, by which improvements the machine is adapted for farmers' or plantation use; and it consists in the construction and arrangement of parts, as hereinafter described.

In the accompanying drawing, Figure 1 represents a view of the machine taken on the line $x$ $x$ of Fig. 2. Fig. 2 is a vertical cross-section taken on the line $y$ $y$.

Similar letters of reference indicate corresponding parts.

A represents the casing or housing of the machine. B is the bed flange by means of which the machine is bolted down to the screen. The machine stands upright, and the cylinder and feeder work on horizontal shafts. C is the cylinder, consisting of an interior shell, D, covered by segments E, (four, more or less, in number,) each provided with cutting ribs F, arranged as represented in Fig. 1. The segments E, with the ribs F, are of cast-iron, and are bolted to the cylinder C, as in the drawing. G is the cylinder-shaft. H is the driving-pulley. In the housing are adjustable knives J, more or less in number, secured by screws to the flanges K. The knives are slotted so that they can be moved in and out, and adjusted to the cutting-ribs of the cylinder by means of the bolts L. M is a removable portion of the housing A, by which access is given to the surface of the cylinder. N is the feeder, consisting of a serrated cylinder on the shaft O. P represents partition-ribs on the cylinder, which partitions project to near the points of the teeth $q$. The seed to be hulled is thrown onto this feeder by means of a hopper above it, and any sticks or nails which may be combined with the seed are prevented from being carried down into the machine by means of the partitions, as such foreign substances cannot enter the grooves between the teeth, and are thrown one side. The seed to be hulled enters these grooves and is carried down and delivered onto the cylinder as the feeder revolves.

Letters Patent of the United States bearing date of March 29, 1870, were issued to me for an improved hulling-machine. Such machine is adapted for use in the manufacture of cotton-seed oil, for which purpose it was designed; but its construction is too complicated, and the adjustment of the cutting-knives is too difficult for farm or plantation use. My object in the present invention has been to simplify the construction of the machine so that it would be managed, and the knives be adjusted by laborers of ordinary intelligence, while greatly lessening the cost.

The feeder N is driven by the belt R from the shaft of the cylinder C, as seen in Fig. 1. There may be any number of the partitions F in the feeder, so that nails and stones may be excluded.

Having thus described my invention, I claim as new and desire to secure by Letters Patent—

1. In combination with a hulling-machine, the feeder N provided with the partition P, constructed substantially as and for the purposes described.

2. In combination with the hopper, the feeder N with partitions P, constructed as described, and either with or without the cylinder C, for excluding sticks, nails, stones, &c., substantially as described.

DAVID KAHNWEILER.

Witnesses:
T. B. MOSHER,
GEO. W. MABEE.

(57)